(12) United States Patent
Rinks

(10) Patent No.: US 9,169,954 B2
(45) Date of Patent: Oct. 27, 2015

(54) QUICK RELEASE TUBE SYSTEMS

(71) Applicant: Calan Group, Inc., Plano, TX (US)

(72) Inventor: William Aubrey Rinks, Lavon, TX (US)

(73) Assignee: Stewart Systems Baking, LLC, Plano, TX (US)

( * ) Notice: Subject to any disclaimer, the term of this patent is extended or adjusted under 35 U.S.C. 154(b) by 87 days.

(21) Appl. No.: 13/952,119

(22) Filed: Jul. 26, 2013

(65) Prior Publication Data

US 2014/0028015 A1     Jan. 30, 2014

Related U.S. Application Data

(60) Provisional application No. 61/676,016, filed on Jul. 26, 2012.

(51) Int. Cl.
| | |
|---|---|
| *B65G 17/42* | (2006.01) |
| *B65G 47/02* | (2006.01) |
| *F16L 37/14* | (2006.01) |
| *B65G 17/00* | (2006.01) |
| *B65G 47/71* | (2006.01) |

(52) U.S. Cl.
CPC ............ *F16L 37/146* (2013.01); *B65G 17/005* (2013.01); *B65G 17/42* (2013.01); *B65G 47/715* (2013.01)

(58) Field of Classification Search
None
See application file for complete search history.

(56) References Cited

U.S. PATENT DOCUMENTS

| | | | | |
|---|---|---|---|---|
| 4,089,408 | A * | 5/1978 | Vanderhoof | 198/890.1 |
| 4,946,022 | A * | 8/1990 | Davis et al. | 198/890.1 |
| 5,746,305 | A * | 5/1998 | Wilkins et al. | 198/890.1 |

\* cited by examiner

*Primary Examiner* — Kavel Singh
(74) *Attorney, Agent, or Firm* — Klemchuk LLP; Kirby B. Drake

(57) ABSTRACT

Quick release tube systems and methods may allow for components of a switching apparatus to be quickly and easily installed, removed, serviced or replaced without requiring an overhead crane or more than one skilled individual to perform the work.

10 Claims, 4 Drawing Sheets

QUICK RELEASE TUBE SYSTEMS

CROSS-REFERENCE TO RELATED APPLICATION

This application claims priority to U.S. Provisional Patent Application No. 61/676,016, entitled "Quick Release Tube Systems and Methods," filed on Jul. 26, 2012, which is hereby incorporated by reference for all purposes.

TECHNICAL FIELD

The present disclosure relates generally to quick release tube systems and methods, and in particular, to quick release tube systems and methods for a switching apparatus conveyor belt that are quickly and easily installable and replaceable by a single user during assembly and necessary maintenance.

BACKGROUND

Switching apparatuses, such as a horizontal switch, are useful in sorting articles. For example, a switching apparatus may receive articles from a single input conveyor and divert the articles to one of two or more output conveyors. Another switching apparatus may receive articles from two or more input conveyors and converge the articles, such that all articles are directed to a single output conveyor. Yet another switching apparatus may receive articles from two or more input conveyors and divert the articles to a plurality of output conveyors. These devices are typically bulky, complicated pieces of equipment, and as such, assembly requires the use of an overhead crane and more than one skilled individual to install. Moreover, like all moving mechanical components, the switching apparatus conveyor belt occasionally needs servicing or replacement, which requires the tedious task of removing all the roller pins securing the rod tubes, which support the pallets of the switching apparatus, to the roller chains of the switching apparatus conveyor belt and removing the length of the rod tubes from sometimes less than ideal locations and angles.

SUMMARY

Embodiments of the present disclosure generally provide quick release tube systems and methods that allow components of the switching apparatus to be quickly and easily installed, serviced or replaced, without requiring an overhead crane or more than one skilled individual.

In an embodiment, the present disclosure provides a quick release tube system comprising a tube assembly having an interior tube member coupled to an exterior tube member. The interior tube member may include a tube head, an interior tube body having a length and a width, and a detent pin connected thereto. The exterior tube member may include an exterior tube body having a length and a width, and bearing two holes. The interior tube member connects or otherwise couples to the exterior tube member by the detent pin locking within one of the holes of the exterior tube member.

In another embodiment, the present disclosure provides a quick release tube system comprising a tube assembly having an interior tube member coupled to an exterior tube member by an external locking means. The interior tube member may include a tube head and an interior tube body having a length and a width, and bearing one hole. The exterior tube member may include an exterior tube body having a length and a width, and bearing two holes. The interior tube member connects or otherwise couples to the exterior tube member by the locking means piercing through one of the holes of the exterior tube member and the hole of interior tube member.

BRIEF DESCRIPTION OF THE DRAWINGS

For a more complete understanding of the present disclosure and its features, reference is now made to the following description, taken in conjunction with the accompanying drawings, in which.

DETAILED DESCRIPTION

The present disclosure generally provides a quick release tube system and method that allows components of a switching apparatus to be easily installed, serviced or replaced to substantially increase efficiency.

Figure 1:
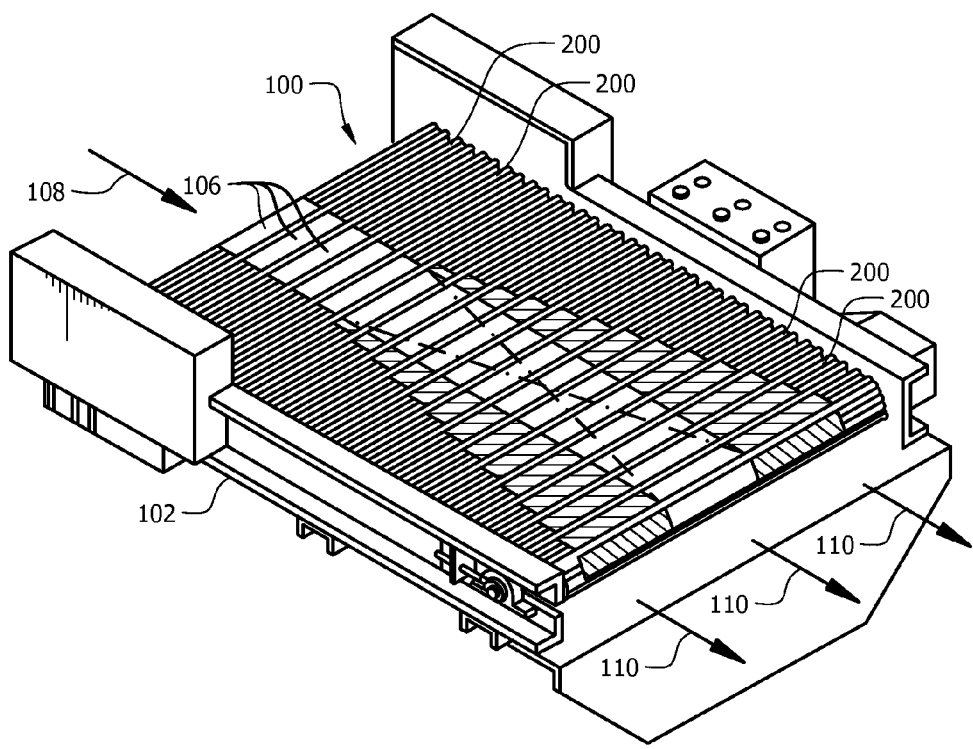
FIG. 1 is an exemplary illustration of a switching apparatus.

FIG. 1 illustrates a switching apparatus system comprising a horizontal switch 100 of the type disclosed and claimed in U.S. Pat. No. 4,946,022. According to one embodiment of the present disclosure, the horizontal switch 100 may further comprise a plurality of quick release tube systems 200. It should be understood that the horizontal switch 100 shown in FIG. 1 is for illustrative purposes only and that any other suitable switching apparatus system or subsystem could be used in conjunction with, or in lieu of, horizontal switch 100 according to one embodiment of the present disclosure.

The horizontal switch 100 generally includes a frame 102, a plurality of quick release tube systems 200, and two roller chains 104. Each roller chain 104 is encased in frame 102 and connected perpendicularly to opposite ends of system 200. When engaged, roller chains 104 cause tube systems 200 to move around the closed course of horizontal switch 100, which includes an upper horizontally disposed article sorting portion, a lower horizontally disposed pallet return portion, and curved end portions interconnecting the upper and lower portions. A plurality of pallets 106 are supported on tube systems 200.

In operation of horizontal switch 100, a sequence of articles is directed onto the pallets 106 along a single input conveyor path 108, and the pallets 106 are actuated to selectively discharge individual articles along any one of the output conveyor paths 110. It should be understood, however, that the horizontal switches of the type disclosed herein can be used to receive articles from a plurality of input conveyor paths and to direct the received articles to one output conveyor path, or a plurality of output conveyor paths.

Figure 2:
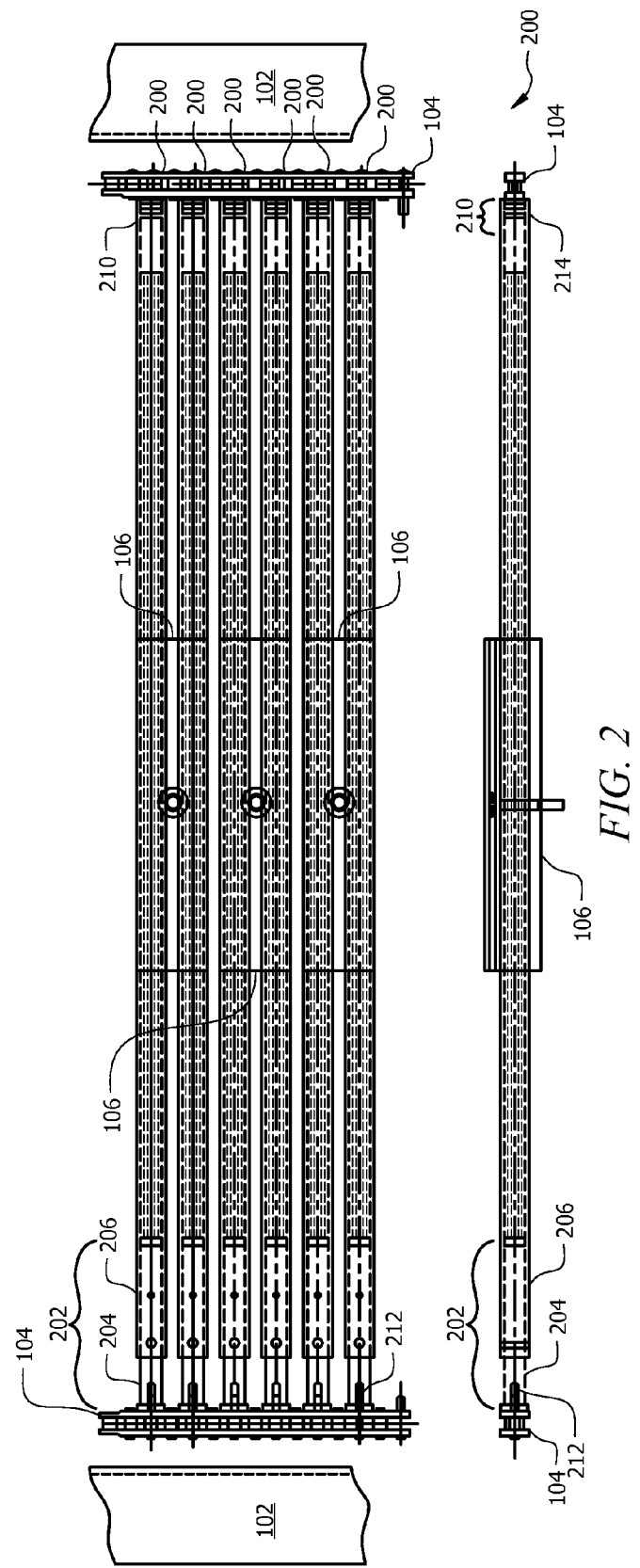
FIG. 2 is a top plan view of a plurality of quick release tube systems used in conjunction with the switching apparatus of FIG. 1 in accordance with one embodiment of the present disclosure.

FIG. 2 depicts a top plan view of a plurality of quick release tube systems 200. It should be understood that quick release tube systems 200 are for illustrative purposes only and that any other suitable system or subsystem may be used in conjunction with, or in lieu of, system 200 according to one embodiment of the present disclosure.

According to an embodiment of the present disclosure, quick release tube system 200 may comprise a tube assembly 202 having an interior tube member 204 and an exterior tube member 206.

Interior tube member 204, as described in more detail below, may generally include a tube head 208. In an embodiment, tube head 208 may be connected to or is otherwise coupled to a first roller chain 104 in any manner that allows tube system 200 to maintain a fixed horizontal position, such as, for example, using roller pin 212 as shown in FIG. 2, or any other suitable method including having male and female coupling adapters, having a bolt and socket attachment, having a ball and socket attachment, having a brass ring and chain attachment, a clip or pin attachment, or using other suitable coupling materials, or any combination thereof.

Exterior tube member 206, as described in more detail below, may generally include tube socket 210. In an embodiment, tube socket 210 may be connected to or is otherwise coupled to a second roller chain 104 in any manner that allows system 200 to maintain a fixed vertical position, such as, for example, using bearing 214 as shown in FIG. 2, or any other suitable method including having male and female coupling adapters, having a bolt and socket attachment, having a ball and socket attachment, having a brass ring and chain attachment, a clip or pin attachment, or using other suitable coupling materials, or any combination thereof.

In an embodiment, a plurality of pallets 106 are coupled to and slidably disposed on top of tube system 200, such that each of the pallets 106 are in continuous contact with each adjacent pallet.

Figure 3A:
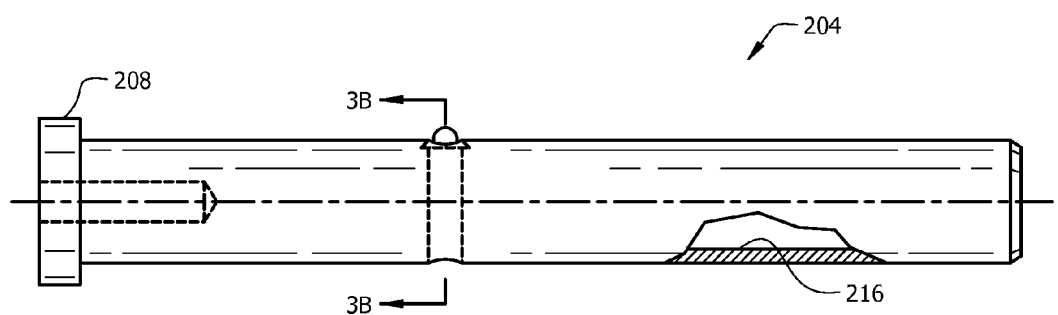
FIG. 3a is a side elevation view of an interior tube member of the tube assembly of FIG. 2 in accordance with one embodiment of the present disclosure.
Figure 3B:
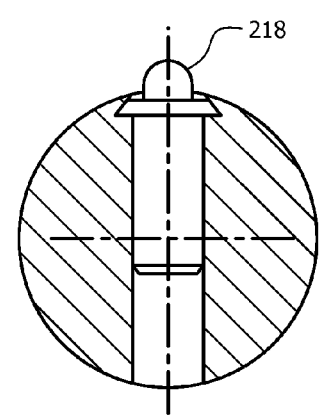
FIG. 3b is an enlarged illustration of the detent pin of the interior tube member of FIG. 3a in accordance with one embodiment of the present disclosure.

FIG. 3a depicts a side elevation view of the interior tube member 204 of FIG. 2 that may be employed in conjunction with an exterior tube member 206 to connect system 200 to horizontal switch 100. FIG. 3b is an enlarged view of the detent pin 218 of interior tube member 204 that may be employed to affix interior tube member 204 to exterior tube member 206. It should be understood that detent pin 218 is for illustrative purposes only and that interior tube 204 may be connected to or otherwise coupled to exterior tube 206 in any other suitable manner according to one embodiment of the present disclosure.

Interior tube member 204 may generally include tube head 208, interior tube body 216, and detent pin 218 connected thereto. In an embodiment, interior tube body 216 may have a length (L) and a width (W). In an embodiment, the detent pin 218 may be positioned approximately a specified distance from the outside edge of tube head 208.

In an embodiment, detent pin 218 may be a spring-loaded plunger that may be manipulated with a screwdriver, plunger tool, pen tip, or other suitable tool to compress the detent pin 218, such that interior tube member 204 may be slidably disposed within exterior tube member 206.

In another embodiment of the present disclosure, detent pin 218 may be a screw, ball lock, retractable pin, press fit plunger, or other suitable removable locking device to connect or otherwise couple interior tube member 204 with exterior tube member 206.

Figure 4:
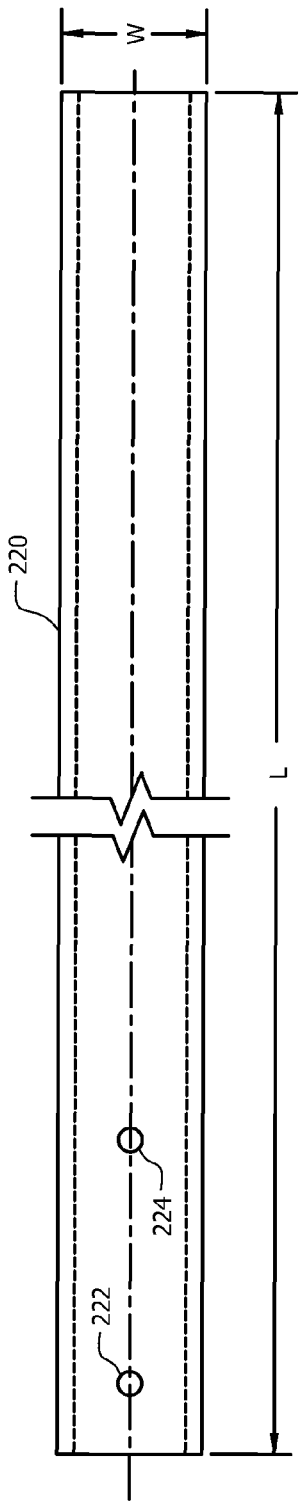
FIG. 4 is a top plan view of an exterior tube member of the tube assembly of FIG. 2 in accordance with one embodiment of the present disclosure.

FIG. 4 depicts a top plan view of the exterior tube member 206 of FIG. 2 that may be employed in conjunction with interior tube member 204 to connect system 200 to horizontal switch 100.

Exterior tube member 206 may generally include exterior tube body 220. In an embodiment, exterior tube body 220 may have a length (L) and a width (W). Exterior tube body 220 may comprise a first hole 222 bored at a position approximately a specified distance from the edge of exterior tube body 220 and a second hole 224 bored at a position approximately a specified distance from the edge of exterior tube body 220, according to one embodiment of the present disclosure.

In an embodiment, the inside wall of exterior tube member 206 may be deburred in a manner that allows interior tube member 204 to be easily disposed within exterior tube member 206.

Figure 5:
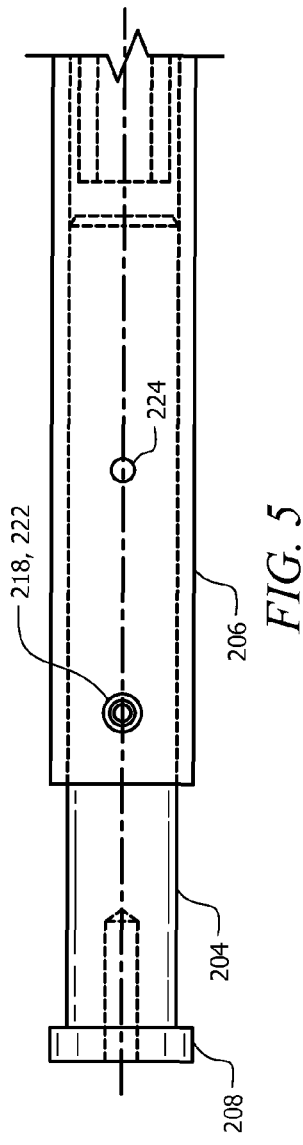
FIG. 5 is a top plan view of a tube assembly of a quick release tube system in the engaged position according to one embodiment of the present disclosure.

FIG. 5 generally illustrates the tube assembly 202 of FIG. 2 in the engaged position. In the engaged position, tube assembly 202 may be employed to connect system 200 to horizontal switch 100 according to one embodiment of the present disclosure.

When tube assembly 202 is in the engaged position, interior tube member 204 may be configured to be slidably disposed within exterior tube member 206, in a manner such that the detent pin 218 of interior tube member 204 may be oriented and locked within hole 222 of exterior tube member 206.

Figure 6:
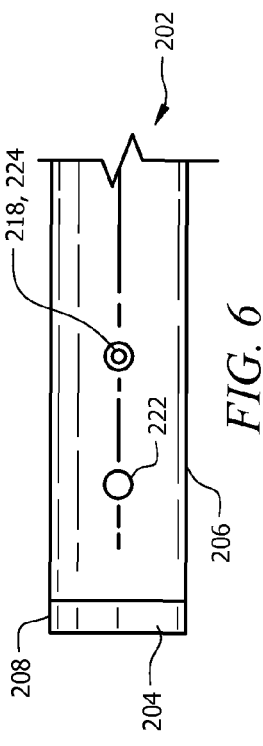
FIG. 6 is a top plan view of a tube assembly of a quick release tube system in the disengaged position according to one embodiment of the present disclosure.

FIG. 6 generally illustrates the tube assembly 202 of FIG. 2 in the disengaged position. In the disengaged position, tube assembly 202 may be employed to quickly and easily disconnect system 200 from the horizontal switch 100 according to one embodiment of the present disclosure.

When tube assembly 202 is in the disengaged position, interior tube member 204 may be configured to be further slidably disposed within exterior tube member 206, in a manner such that the detent pin 218 of interior tube member 204 may be oriented and locked within hole 224 of exterior tube member 206.

In operation, during the installation of system 200, a user would orient interior tube member 204 so that the detent pin 218 is in line with hole 222 and hole 224 of exterior tube member 206. The user may then compress detent pin 218 such that interior tube member 204 may slide within exterior tube member 206 until detent pin 218 is oriented and locked within hole 222. The user may then connect tube head 208 to first roller chain 104 and tube socket 210 to second roller chain 104.

During maintenance and removal of system 200, a user may quickly and easily disconnect system 200 from horizontal switch 100 by first disconnecting tube head 208 from first roller chain 104 and tube socket 210 from second roller chain 104. The user may then compress detent pin 218 and slidably dispose interior tube member 202 further within exterior tube member 204 until detent pin 218 is oriented and locked within hole 224. Once tube assembly 202 is in this disengaged position, the user may easily lift system 200 along an angular axis and remove system 200 from horizontal switch 100.

In an embodiment, any of the interior tube member 204 and exterior tube member 206 of system 200 may be made of metal, plastic, synthetic rubber, natural rubber, plastic, polyurethane, polyethylene, polyvinyl chloride (PVC), polytetrafluoroethylene (PTFE), wood, nylon, polyester, high-gloss polyester, laminate, plexiglass, polymer, glass, aluminum, brass, bronze, stainless steel, other suitable materials, or any combination thereof.

Any of the roller pin 212, bearing 214, and detent pin 216 may be made of metal, steel, aluminum, brass, bronze, nylon, plastic, wood, polyester, high-gloss polyester, laminate, synthetic rubber, natural rubber, plexiglass, polymer, other suitable materials, or any combination thereof.

In an embodiment, interior tube member 204, exterior tube member 206, roller pin 212, bearing 214, and/or detent pin 216 may be embellished with different paints, colors, patterns, ornamental items, removable stickers, paints, stencils, chalks, designs, images, other decorative materials, or any combination thereof to enhance or otherwise achieve the desired décor of the surroundings.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A switching apparatus conveyor belt comprising:
    a quick release tube system including a tube assembly having an interior tube member slidably disposed within an exterior tube member, the interior tube member having a tube head and an interior tube body with a length and a width and the exterior tube member having a tube socket and an exterior tube body with a length and a width; and
    a frame supporting a first roller chain and a second roller chain connected perpendicularly to opposite ends of the tube assembly, wherein the tube head of the interior tube member couples to the first roller chain and the tube socket of the exterior tube member couples to the second roller chain.

2. The quick release tube system of claim 1, further comprising:
    a detent pin coupled to the interior tube member.

3. The quick release tube system of claim 2, wherein the interior tube member couples to the exterior tube when the detent pin locks within a first hole or a second hole disposed in the exterior tube body.

4. The quick release tube system of claim 3, wherein the detent pin may be depressed to release the detent pin from the first hole or the second hole in the exterior tube body and thereby allow the interior tube member to slide within the exterior tube member.

5. The quick release tube system of claim 1, further comprising:
    a locking means disposed between a hole in the interior tube body and a hole in the exterior tube body.

6. The switching apparatus conveyor belt of claim 1, further comprising one or more pallets coupled to the tube assembly.

7. The switching apparatus conveyor belt of claim 1, wherein the tube assembly is in an engaged position when the detent pin is locked within the first hole; and wherein the tube assembly is a disengaged position when the detent pin is locked within the second hole.

8. The switching apparatus conveyor belt of claim 7, wherein the tube assembly is removable from the switching apparatus conveyor belt in the disengaged position.

9. A method for installing and releasing a tube assembly from a switching apparatus conveyor belt comprising:
    providing the tube assembly comprising an interior tube member with a detent pin disposed within an exterior tube member with a first hole and a second hole;
    sliding the interior tube member with respect to the exterior tube member until the detent pin locks in the first hole of the exterior tube member; and
    coupling the interior tube member to a first roller chain and coupling the exterior tube member to a second roller chain of the switching apparatus conveyor belt.

10. The method of claim 9, further comprising:
    disconnecting the interior tube member from the first roller chain and disconnecting the exterior tube member from the second roller chain;
    compressing the detent pin to withdraw the detent pin from the first hole;
    sliding the interior tube member with respect to the exterior tube member until the detent pin locks in the second hole of the exterior tube member; and
    removing the tube assembly from the switching apparatus conveyor belt.

* * * * *